Figure 1:
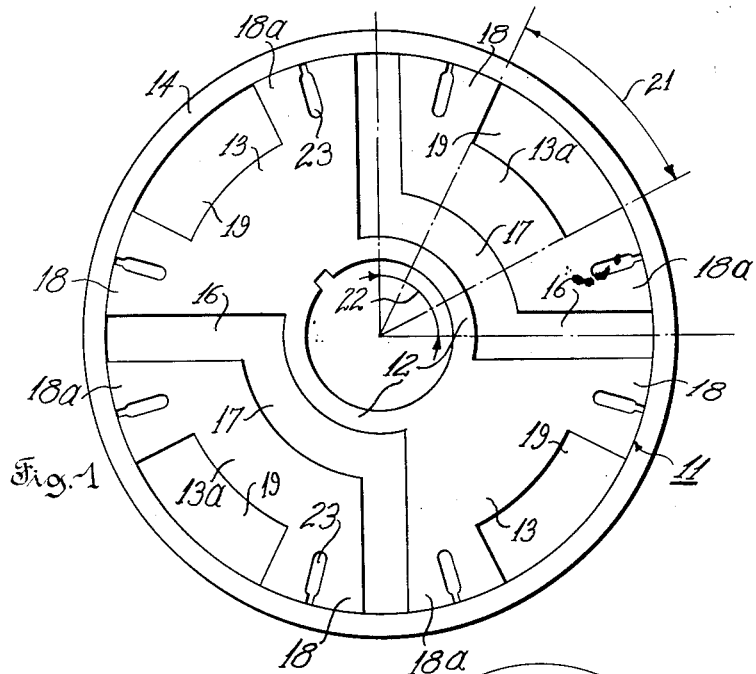

Oct. 30, 1956 N. O. RISCH 2,769,108
SEGMENTED ROTOR CORE LAMINATION FOR USE
IN A SYNCHRONOUS INDUCTION MOTOR
Filed April 1, 1955

Inventor
Nelson O. Risch
By Robert B. Benson
Attorney

United States Patent Office 2,769,108
Patented Oct. 30, 1956

2,769,108

SEGMENTED ROTOR CORE LAMINATION FOR USE IN A SYNCHRONOUS INDUCTION MOTOR

Nelson O. Risch, Fort Thomas, Ky., assignor to Allis-Chalmers Manufacturing Company, Milwaukee, Wis.

Application April 1, 1955, Serial No. 498,584

4 Claims. (Cl. 310—265)

This invention relates generally to an improved rotor for use in a synchronous induction motor. More specifically this invention relates to a segmented rotor core lamination for use in a synchronous induction motor rotor which gives the rotor increased mechanical strength.

The lamination and the rotor of this invention are especially adapted for use in a synchronous induction motor such as the one described in U. S. patent application Serial No. 474,694, filed December 13, 1954, now Patent No. 2,733,362, by P. F. Bauer and V. B. Honsinger. Synchronous induction motors of the type mentioned above utilizes a segmented rotor having axially extending groves spaced along its circumference to control the flux path through the rotor. The segmented rotors of the prior art are difficult to assemble and use a nonmagnetic rotor shaft or bushing to magnetically isolate the segments. The prior art rotor has poor mechanical strength which results in the rotor slipping on the shaft and hence a poor rotor to shaft fit. This slipping of the rotor on the shaft is partially due to the straining deformation of the aluminum holding the rotor core segments together. The straining and deformation of the aluminum occurs when the nonmagnetic bushing is press fitted on the shaft and causes little more than a wringing fit between the segments and the bushing. Another cause of slipping is the thermal expansion of the aluminum holding the segments together due to rotor heating. Such expansion tends to move the rotor core segments away from the shaft or bushing thereby relaxing the grip of the rotor core segments on the bushing or shaft.

The rotor of this invention overcomes the above mentioned defects of the rotors used in prior art synchronous induction motors because it is made up of laminations having a central web joining alternate segments. The central web or member gives the rotor a reliable rotor to shaft fit, preventing the rotor from slipping on the shaft during synchronous operation of the motor, and joins with alternate segments to make the rotor mechanically stronger than similar prior art rotor.

Therefore it is the object of this invention to provide a rotor for use in a synchronous induction motor that has a reliable rotor to shaft fit.

Another object of this invention is to provide rotor lamination for use in a rotor of a synchronous induction motor that eliminates the necessity of using a nonmagnetic shaft or bushing with the rotor.

Another object of this invention is to provide a rotor lamination that will make the rotor mechanically stronger, more economical, and easier to manufacture than similar rotors using prior art laminations.

Another object of this invention is to provide a rotor lamination for use in a rotor of a synchronous induction motor that will not slip on the shaft during synchronous operation.

Figure 2:
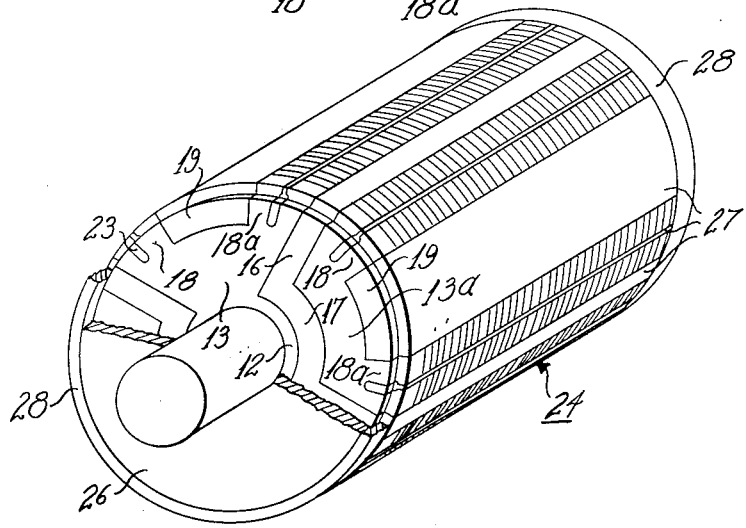

Objects and advantages other than those set forth above will be apparent from the following description when read in connection with the accompanying drawings, in which:

Fig. 1 is a plan view of the preferred lamination; and
Fig. 2 is an orthographic view of the rotor embodying the lamination of Fig. 1.

As shown in the drawings, the lamination 11 has a central web or annular member 12, an even number of rotor segments 13 and 13a, and a circumferential web or annular element 14. Adjacent segments 13 and 13a are separated by a radially extending dividing slot 16. Alternate segments 13 have their inner ends joined to the outer periphery of the central web 12. The remaining segments 13a are radially spaced from the central web 12 by arcuately extending slots 17. The arcuately extending slot 17 is preferably of the same width as the radially extending dividing slots 16. Each segment 13, 13a has salient portions 18, 18a adjacent the dividing slots 16 and separated by a groove 19. The arcuate length 21 of the groove 19 preferably subtends 45 to 55% of the sector angle 22 of the segments 13, 13a. The salient portions 18, 18a of the segments 13, 13a have circumferentially spaced radially extending winding slots 23. The annular element or circumferential web 14 joins the salient portions 18, 18a to form an annular lamination.

The rotor 24 of Fig. 2 is constructed of a plurality of laminations 11 in axial register, as shown in Fig. 1. The grooves 19 and slots 16, 17, 23 are axially aligned and filled with a nonmagnetic electrically conducting material preferably aluminum. The material in the slots 16, 17, 23 and grooves 19 is interconnected at the ends of the rotor 24 by a ring 26 to form a squirrel cage winding 27. The rotor 24 is mounted on a shaft, and turned in a lathe to remove the web 14 from the circumference of the rotor and to segment the parts of each lamination.

The rotor may be provided with nonmagnetic bands 28 to hold the segments together and to prevent radial displacement of the segments in response to the centrifugal force generated in the rotor during high speed operation.

In a magnetic rotor the flux path will take the line of least reluctance. The flux path through the lamination of this invention is controlled by increasing the reluctance in areas where no flux path is desired. In the rotor lamination of this invention the slots 16, 17 and grooves 19 are sufficiently wide and deep to minimize the flux therethrough and are positioned to control the flux path in the lamination. The dividing slots 16 join with the arcuately extending slots 17 to magnetically isolate adjacent segments 13, 13a from each other. The flux path through the central web 12 from one segment 13 to an alternate segment 13 is negligible because the relatively long path has higher reluctance than the path between the salient portions 18, 18a of the same segment which are of opposite polarity. Hence the flux path of least reluctance would be between adjacent salient portions in the same segment and the poles of the rotor would be concentrated in the salient portions of the laminations.

In the rotor core lamination 11 of this invention the central web or ring 12 provides a reliable rotor to shaft fit. Adjacent segments are magnetically isolated from each other by the radial dividing slots and the arcuately extending slots thereby eliminating the necessity of nonmagnetic bushings or shafts to magnetically isolate the segments as is done in the prior art. The elimination of the nonmagnetic bushing between the rotor and the shaft eliminates the slipping of the rotor on the shaft that is caused in prior art synchronous induction motors by the aluminum being deformed when the nonmagnetic bushing was press-fitted into the rotor. Having alternate segments secured to the central ring that encircles the shaft prevents slipping of the rotor on the shaft caused by the rotor segments moving away from the shaft or bushing when the aluminum expands due to rotor heat.

The circumferential web holds the segments together for die casting the rotor core assembly. The circumferential web is removed to separate the rotor core segments by turning the assembled rotor on a lathe after the rotor core has been die cast. Segmenting the rotor in this way does not require an additional operation but merely requires removing a little more material when the rotor is turned on the lathe to achieve the desired rotor to stator air gap in the assembled motor.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. A rotor core lamination for use in a synchronous induction motor, said rotor core lamination comprising a central annular member mountable on a rotatable shaft, an even number of segments greater than two disposed about said member, said segments defining therebetween radially extending dividing slots, each of said segments having salient portions adjacent said slots, said portions defining a groove therebetween, each of said portions having a radially extending winding slot, alternate said segments having their radially innermost parts joined to the outer periphery of said annular member, the others of said segments being radially spaced from said annular member, and an annular element joining said salient portions.

2. A rotor core lamination for use in a synchronous induction motor, said rotor core lamination comprising a central annular member mountable on a rotatable shaft, an even number of segments greater than two disposed about said member, said segments defining therebetween radially extending dividing slots, each of said segments having salient portions adjacent said slots, said portions defining a groove therebetween, the arcuate length of said groove subtending in angle 45 to 55% of the sector angle of the segment, each of said portions having a radially extending winding slot, alternate said segments having their radially innermost parts joined to the outer periphery of said annular member, the others of said segments being radially spaced from said annular member, and an annular element joining said salient portions.

3. A rotor core lamination for use in a synchronous induction motor, said rotor core lamination comprising a central annular member mountable on a rotatable shaft, an even number of segments greater than two disposed about said member, said segments defining therebetween radially extending dividing slots, each of said segments having salient portions adjacent said slots, said portions defining a groove therebetween, each of said portions having at least one winding slot, alternate said segments having their radially innermost parts joined to the outer periphery of said annular member, the others of said segments being radially spaced from said annular member, to form an arcuately extending slot therebetween of the same width as said dividing slot, and an annular element joining said salient portions.

4. A rotor for use in a synchronous induction motor, said rotor comprising a magnetic core, said core having a plurality of lamination means, each of said lamination means comprising an annular member mountable on a rotatable shaft, an even number of segments greater than two disposed about said member, said segments defining therebetween radially extending dividing slots, each of said segments having salient portions adjacent said slots and defining a groove therebetween, each of said salient portions having at least one winding slot, alternate said segments having their radially innermost parts joined to the outer periphery of said annular member, the other of said segments being radially spaced from said annular member to form an arcuately extending slot therebetween, said lamination means being in axial register to align corresponding said slots and grooves, said grooves and slots being filled with a nonmagnetic electrically conducting material and interconnected with each other at the ends of said rotor by a ring to form a cylindrical rotor with a squirrel cage winding.

References Cited in the file of this patent

UNITED STATES PATENTS

| | | |
|---|---|---|
| 1,915,069 | Morrill et al. | June 20, 1933 |
| 2,483,848 | Saretzky | Oct. 4, 1949 |